Aug. 22, 1939.   J. M. MURRAY ET AL   2,170,088
STOP SIGNAL CONTROL
Filed Sept. 24, 1936
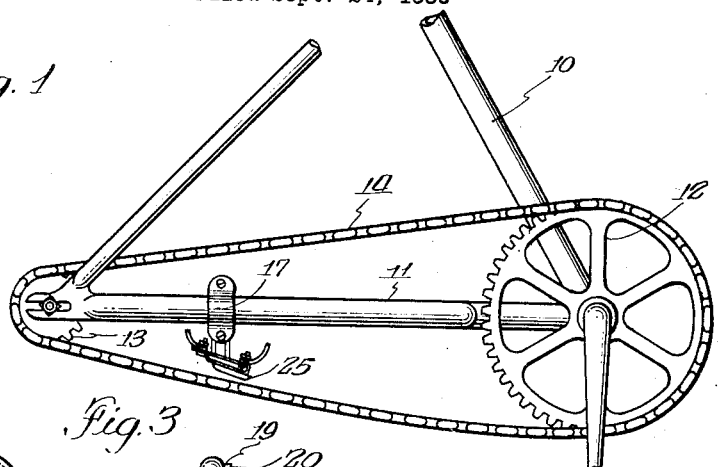
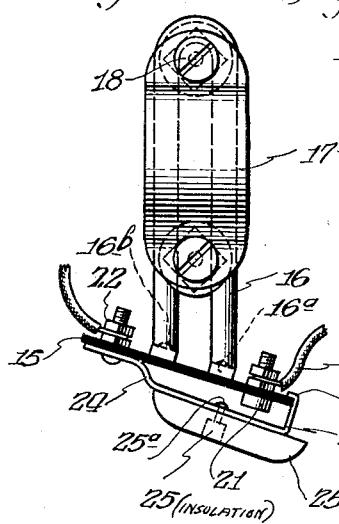
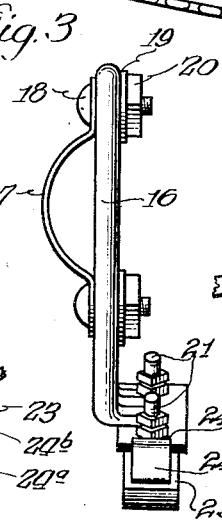
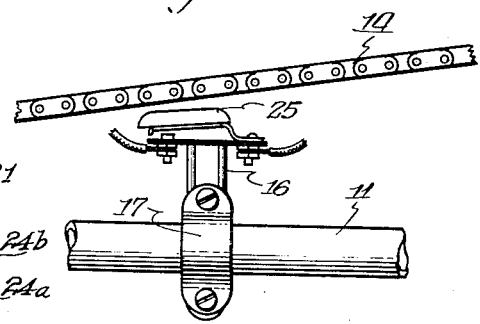
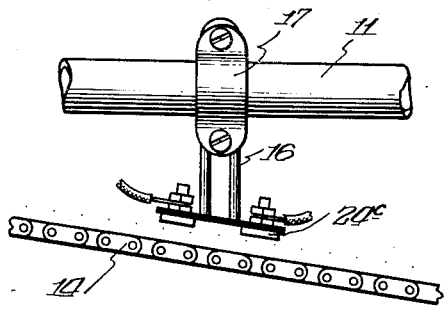
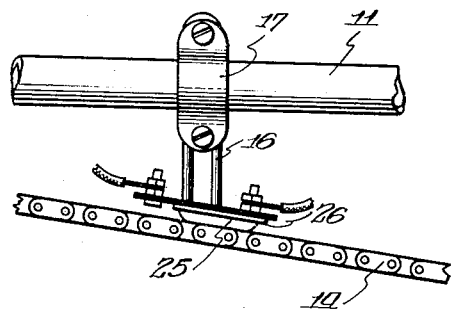
Inventors:
James M. Murray
Thomas J. Murray
By: Stevens + Batchelor
Atty's.

Patented Aug. 22, 1939

2,170,088

UNITED STATES PATENT OFFICE 2,170,088

STOP SIGNAL CONTROL

James M. Murray and Thomas J. Murray, Chicago, Ill.

Application September 24, 1936, Serial No. 102,427

14 Claims. (Cl. 200—52)

Our invention relates to stop signals or lights of the type employed on bicycles, and more particularly to the controls therefor, and my main object is to provide a control which is actuated by the drive chain of the bicycle.

A further object of the invention is to locate the novel control between the runs of the chain and to mount the same on the bottom fork of the bicycle frame.

A still further object of the invention is to form the control as a switch which is closed by a change of course by one of the chain runs.

An additional object of the invention is to incorporate in the novel control an electrical switch whose contacts are in proximity to one of the chain runs and are adapted to be closed by the aforesaid action thereof.

Another object of the invention is to provide a mounting for the novel control which is adjustable in relation to the related chain run whereby to make the control fit all makes of bicycles.

An important object of the invention is to so design the novel control that it is compact, has no projecting parts, and is simply constructed.

With the above objects in view, and any others which may suggest themselves from the description to follow, a better understanding of the invention may be had by reference to the accompanying drawing in which—

Fig. 1 is an elevation of a fragment of a bicycle frame and drive showing the novel control installed;

Fig. 2 is an enlarged elevation of the control;

Fig. 3 is a side view of Fig. 2 from the right;

Fig. 4 is an elevation of the control as used in inverted position;

Fig. 5 is an elevation of a modification; and

Fig. 6 is an elevation of a further modification.

The popularity of the bicycle in late years has given rise to various modern developments for purposes of safety, utility and style. One safety item is a smaller replica of the conventional automobile stop light, the same employing a small electric bulb receiving its current supply from a dry battery. For purposes of control, one or two automatic devices have appeared on the market, but we find that these are unreliable at times and more or less involved in construction. We have therefore devised the novel control as an article which is simple, dependable and capable of installation in an out-of-the-way position.

In accordance with the foregoing, specific reference to the drawing indicates a typical bicycle frame at 10, the same having its bottom fork at 11 and receiving the sprockets 12 and 13 for the drive chain 14. As previously mentioned, the novel control utilizes the action of one of the chain runs, and for this purpose we choose to mount the control on that fork member 11 which extends between them. Thus, the control is formed with an insulation base plate 15 over which is mounted a bracket 16 having the form of a narrow arch. The feet 16a of the bracket are bent horizontally and riveted to the base 15 as indicated at 16b, whereby to have the bracket rigidly attached to the base. The bracket 16 is preferably formed from a heavy piece of wire, the feet 16a being flattened to afford room for the passage of the rivets 16b.

In order that the bracket 16 may be mounted along the inner side of the fork member 11, we apply an arched clip 17 over the outer side thereof, passing bolts 18 from the clip through the space within the bracket to take washers 19 and nuts 20 along the inner side thereof. As most fork members are of semi-circular or segmental cross-section, it will be evident that this type of clamp conforms to the shape of the fork member and secures a rigid connection of the bracket thereto.

In the main form of the control as illustrated in Figs. 1 to 4, the base plate 15 is provided with a pair of terminal binding posts 21, these receiving securing nuts 22 above the plate for the attachment of the wire sections 23 forming a part of the stop light circuit. One of the binding posts also secures one end of a spring strip 24 which extends with a drop or offset to a point slightly below the other binding post, then taking an upward bend 24a and terminating with a backward bend 24b which rests on the corresponding end of the plate 15. The spring strip 24 carries an insulating shoe 25 on its under side, the same being secured thereto by a rivet 25a countersunk from below. The shoe is rounded off from the bottom towards its ends, as indicated at 25b. With the control in the normal position indicated in Fig. 2, the spring strip 24 is tensioned downwardly and utilizes its terminal bend 24b as a stop in connection with the base plate 15. The latter being of insulation separates the circuit wires 23 electrically. However, should the shoe 25 receive upward pressure to raise the strip 24 into contact with the right hand binding post, then the strip forms a connection or closed switch for the said wires.

With the novel control installed as in Fig. 1, it is seen that the shoe 25 of the switch is close and substantially parallel to the lower run of the bicycle chain 14. During the forward drive, the upper run of the chain is tense, while the lower one has some slack or sag, as shown. The novel control is so positioned that the lower run in the condition mentioned amply clears the shoe 25, so that during the forward motion of the bicycle the control is not affected. However, when speed is to be slackened or a stop anticipated, it is customary to reverse the drive somewhat in order to apply the coaster brake in the rear wheel. This action reverses the previous condition of the chain runs, so that the lower one becomes tense or taut. In doing this, the lower run rises sufficiently to bear upwardly on the shoe 25 and close the switch of the control, so that the stop light is put into action. Obviously, as soon as the bicycle is desired to coast or be driven forward, the condition of the chain is changed to normal and the switch caused to open.

If desired, the control may be inverted as shown in Fig. 4, to operate in connection with the upper chain run. This run, as shown, is tense during the forward drive, but relaxes and sags when the coaster brake is applied. In doing this, the chain run drops upon the shoe 25 and by its weight causes the latter to make the switch contact.

The control may also be modified as in Fig. 5 to cause the chain itself to make the electrical contact. Thus, the binding posts are formed into plates 24c at the bottom and are normally in spaced relation to the lower run of the chain. When the latter rises by the application of the coaster brake, it will bridge the contact plates 24c and close the switch.

A further modification of the switch is shown in Fig. 6. This form of the invention is adapted solely to bicycles having solid rear hubs without coaster brakes. Here one of the binding posts receives a metal slide 26 on the bottom, such slide carrying the shoe 25c. Ordinarily, the plate 26 is in spaced relation to the other binding post, but may be slid to meet the same in order to make the contact. As was formerly explained, the lower chain run is in relaxed or sagging condition on the forward drive, and therefore does not rise to the height of the shoe 25c at such time. However, when the operator reduces speed by applying force in a reverse direction to the pedals, such run will rise to make such contact, but will continue its normal rearward movement. This continued rearward movement of the lower chain run in its tense state causes the shoe 25c to move the slide 26 rearwardly and make the contact. Obviously, the slope of the switch carries the slide away from the contact as soon as pressure on the shoe is removed, cutting off the stop light.

It is evident from the above description that we have provided an automatic control for stop lights which is dependable because it is actuated by a positive drive member whose changes of position are well recognized and particularly suited for the novel control. Further, the latter is mounted rigidly, yet in an out-of-the-way place, so as not to interfere with the operation of the bicycle mechanism or the movements of the rider. Further, the height of the bracket 16 permits the same to be adjusted vertically in relation to the clip 17 and fork member 11, so as to place the shoe 25 in proper spacing to the related chain run. Finally, the novel control is an article which is made up of the fewest number of parts consistent with simplicity and efficient operation, and is built so compactly as to have none of its parts projecting laterally from the zone of its installation.

While we have illustrated and described the invention and a few of its modifications along specific lines, the same are clearly susceptible of minor changes and refinements, and we consider all such changes and refinements as coming within the scope and spirit of the appended claims.

We claim:

1. In a bicycle having wheels, a drive chain and a frame including a frame member located adjacent said chain, a bracket carried by said frame member, a normally open switch carried by said bracket within the loop of said chain and in vertically spaced proximity to one run thereof, said chain run being movable vertically to engage said switch and close the same upon a change of tension of said run occasioned by the application of force in a reverse direction to the pedals of said bicycle.

2. The structure of claim 1, and said bracket including means for varying the spacing of said switch from said chain run.

3. The structure of claim 1, said bracket being applied to one side of said frame member, and said bracket attaching means comprising a clamp applied from the opposite side of said member to secure the bracket to said frame member.

4. The structure of claim 1, said bracket being longitudinally perforated, and said bracket attaching means comprising, a clip engaging said frame member and applied to said bracket, bolts passing freely from the clip through said bracket perforation to permit sliding said bracket relative to said frame member, and nuts applied to said bolts from the other side of said bracket to secure the latter as adjusted to said frame member.

5. The structure of claim 1, said bracket being a narrow arch, laterally extending feet on the lower end of said bracket secured to said base, and said bracket attaching means comprising a clip engaging said frame member and applied to said bracket, bolts passing freely from said clip through the space in said bracket to permit sliding the latter relative to said frame member to adjust said bracket, and nuts applied to said bolts from the other side of said bracket to secure the latter as adjusted.

6. A switch for chain driven bicycles, comprising an insulating base, a pair of spaced binding posts carried by the latter, a spring contact strip extending from one binding post to a point in proximity to the other binding post, an insulating shoe carried by said strip in spaced proximity to one run of the drive chain, said run being engageable with said shoe to move the same and said strip into engagement with said second binding post upon a change in the degree of tenseness of said run of said chain occasioned by a reversal of the direction of movement of said chain.

7. A switch for chain driven bicycles, said switch being normally open and including a movable and a stationary contact, means mounting said switch on said bicycle, said movable contact being located to position the same normally in vertically spaced proximity to one run of said chain, and said run of said chain being movable vertically to engage said movable contact and move the same into engagement with said stationary contact and close said switch upon the application of force in a reverse direction to the pedals of said bicycle.

8. A signal switch for chain driven bicycles comprising a pair of substantially vertical spaced contacts, the lower contact being movable into engagement with the upper one to close said switch, an element carried by said lower contact in spaced proximity to the normally slack run of said chain, said run being adapted to raise said element and said lower contact to close said switch upon said run being tensed by a reversal of said drive chain.

9. A stop signal switch for chain driven bicycles, said switch including a pair of spaced contacts, means mounting said switch on said bicycle within the loop of said chain in vertically spaced proximity to one run of said chain, said run being movable vertically to bridge said contacts and close said switch upon a change in the degree of tenseness of said run occasioned by a reversal of the normal direction of movement of said chain.

10. A switch for chain driven bicycles, said switch being normally open and including a movable and a stationary contact, means mounting said switch on said bicycle, said movable contact being located to position the same normally in vertically spaced proximity to one run of said chain, said run of said chain being movable vertically to engage said movable contact and move the same into engagement with said stationary contact and close said switch upon reverse pedalling of said bicycle, and said movable contact being swingably connected to said switch and being movable in a substantially vertical direction under the influence of said chain run to close said switch.

11. A switch for chain driven bicycles, said switch being normally open and including a movable and a stationary contact, means mounting said switch on said bicycle, said movable contact being located to position the same normally in vertically spaced proximity to one run of said chain, and said run of said chain being movable vertically to engage said movable contact and move the same into engagement with said stationary contact and close said switch upon the application of force in a reverse direction to the pedals of said bicycle, and said movable contact being slidably connected to said switch and being movable in a substantially horizontal direction under the influence of said chain run to close said switch.

12. In a bicycle having wheels, a drive chain and a frame including a frame member located adjacent to said chain, a chain actuated circuit closer carried by said frame member within the loop of said chain, said circuit closer including means normally vertically spaced from said chain, said chain being movable vertically to engage said means and close said switch upon a change in tension of said chain occasioned by the application of force in a reverse direction to the pedals of said bicycle.

13. The structure of claim 12, and said circuit closer including means for automatically opening the same upon vertical movement of said chain in the opposite direction occasioned by forward pedalling of said bicycle.

14. In a bicycle having wheels, a drive chain and a frame including a frame member located adjacent to said chain, a chain actuated circuit closer carried by said frame member within the loop of said chain in spaced relation thereto, said closer including a pair of spaced contacts, said chain being movable vertically to engage at least one of said contacts and close said switch upon a change in tension of said chain occasioned by the application of force in a reverse direction to the pedals of said bicycle.

JAMES M. MURRAY.
THOMAS J. MURRAY.